US007395533B2

(12) United States Patent
Suzuki

(10) Patent No.: US 7,395,533 B2
(45) Date of Patent: Jul. 1, 2008

(54) INFORMATION PROCESSING APPARATUS AND METHOD, COMPUTER PROGRAM THEREFOR, AND COMPUTER-READABLE STORAGE MEDIUM

(75) Inventor: Takehiro Suzuki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 733 days.

(21) Appl. No.: 10/291,704

(22) Filed: Nov. 12, 2002

(65) Prior Publication Data

US 2003/0093768 A1    May 15, 2003

(30) Foreign Application Priority Data

Nov. 15, 2001  (JP)  ............................. 2001-350611
Sep. 24, 2002  (JP)  ............................. 2002-278118

(51) Int. Cl.
*G06F 9/445* (2006.01)

(52) U.S. Cl. .................................................... 717/174

(58) Field of Classification Search .......... 717/168–178
See application file for complete search history.

(56) References Cited

U.S. PATENT DOCUMENTS 6,282,711 B1 *  8/2001  Halpern et al. ............... 717/175

2002/0083228 A1 *  6/2002  Chiloyan et al. ............... 710/9
2003/0041324 A1 *  2/2003  Anderson et al. ........... 717/174
2003/0046447 A1 *  3/2003  Kouperchliak et al. ...... 709/321
2003/0066066 A1 *  4/2003  Nguyen et al. .............. 717/178

* cited by examiner

*Primary Examiner*—William Wood
(74) *Attorney, Agent, or Firm*—Fitzpatrick, Cella, Harper & Scinto

(57) ABSTRACT

Disclosed are an information processing apparatus and a server for communicating with this information processing apparatus. The apparatus, which is for communicating with a peripheral device, includes acquisition means for acquiring one item of identification information that specifies a peripheral device, the identification information being output by the peripheral device in response to connection of the peripheral device or activation thereof; management means for managing a plurality of drivers, which correspond to the one item of identification information that specifies the peripheral device, together with information indicative of a set of drivers; input means for inputting information indicative of a set of drivers to be installed or updated; and recognition means for recognizing a driver to be installed or updated among the plurality of drivers managed by the management means, based upon the identification information acquired by the acquisition means and the information indicative of the set of drivers input by the input means.

13 Claims, 14 Drawing Sheets

FIG. 3

XXXXX Printer Driver ver2.10 Printer Driver Setup Wizard

CHECK THE FOLLOWING CHECK BOX WHEN INSTALLING THE DRIVER OF A USB-CONNECTED PRINTER

30 — ☐ INSTALL USB-CONNECTED PRINTER

31 ⎰ ○ PRINTER LANGUAGE A
   ⎱ ○ PRINTER LANGUAGE B

BACK  NEXT  CANCEL

FIG. 4

XXXXX Printer Driver ver2.10 Printer Driver Setup Wizard

CHECK THE FOLLOWING CHECK BOX WHEN INSTALLING THE DRIVER OF A USB-CONNECTED PRINTER

30 — ☒ INSTALL USB-CONNECTED PRINTER

31 ⦃ ⦿ PRINTER LANGUAGE A
○ PRINTER LANGUAGE B

[BACK] [NEXT] [CANCEL]

FIG. 10

XXXXX  Driver  ver2.10  Setup  Wizard

CHECK THE FOLLOWING CHECK BOX WHEN INSTALLING THE
DRIVER OF A USB-CONNECTED PERIPHERAL DEVICE

1001 — ☐ INSTALL USB-CONNECTED PERIPHERAL DEVICE

1002 —
- ☐ PRINTING FUNCTION
- ☐ FAX TRANSMISSION FUNCTION
- ☐ SCANNING FUNCTION

⦿ PRINTER LANGUAGE A        ○ PRINTER LANGUAGE B

⦿ SCANNER LANGUAGE A        ○ SCANNER LANGUAGE B

[BACK]  [NEXT]  [CANCEL]

FIG. 11

XXXXX Driver ver2.10 Setup Wizard

CHECK THE FOLLOWING CHECK BOX WHEN INSTALLING THE DRIVER OF A USB-CONNECTED PERIPHERAL DEVICE

☒ INSTALL USB-CONNECTED PERIPHERAL DEVICE

☐ PRINTING FUNCTION
☐ FAX TRANSMISSION FUNCTION
☐ SCANNING FUNCTION

1101

⦿ PRINTER LANGUAGE A
○ PRINTER LANGUAGE B

⦿ SCANNER LANGUAGE A
○ SCANNER LANGUAGE B

BACK   NEXT   CANCEL

FIG. 14

XXXXX Driver ver2.10 Setup Wizard

CHECK THE FOLLOWING CHECK BOX WHEN INSTALLING THE DRIVER OF A USB-CONNECTED PERIPHERAL DEVICE

[X] INSTALL USB-CONNECTED PERIPHERAL DEVICE

[X] PRINTING FUNCTION     (●) PRINTER LANGUAGE A     ( ) PRINTER LANGUAGE B

[X] FAX TRANSMISSION FUNCTION

[X] SCANNING FUNCTION     (●) SCANNER LANGUAGE A     ( ) SCANNER LANGUAGE B

[BACK] [NEXT] [CANCEL]

INFORMATION PROCESSING APPARATUS AND METHOD, COMPUTER PROGRAM THEREFOR, AND COMPUTER-READABLE STORAGE MEDIUM

FIELD OF THE INVENTION

This invention relates to an information processing apparatus and method, a computer program therefor, and a computer-readable storage medium storing the program.

BACKGROUND OF THE INVENTION

Computer processing capability has improved remarkably in recent years and computers can run an operating system that employs a graphical user interface (GUI). In addition, installation of the driver programs that control peripheral devices is now much simpler in comparison with systems that rely upon a character user interface (CUI).

For example, consider an operating system such as Windows 98, which is provided by Microsoft Corporation. Such a system comes equipped with a plurality of drivers as standard equipment and also has a plug-and-play capability that automatically detects the model of a peripheral connected to the computer and automatically installs the driver that conforms to the model.

With regard to installation in a plug-and-play environment, the computer receives the device ID from the peripheral and installs the device driver (referred to simply as a "driver" below) that corresponds to this device ID.

A multifunction peripheral has a plurality of functions, such as a printing function, facsimile function and scanning function. In such case a printer driver, fax driver and scanner driver corresponding to these functions exist with respect to a single device ID. Consequently, when plug and play is attempted, the fact that a plurality of drivers correspond to a single device ID means that a driver cannot be specified merely by the device ID received from the peripheral.

In addition, there are cases where the version of an already existing driver is upgraded to a driver for a peripheral that has been newly developed. In order to install or update a new driver, it is required that the user input the storage location of the new driver to the system. Making this input is difficult for a user who is not accustomed to this task.

There are also instances where a peripheral has two or more interfaces, such as an interface that does not support plug and play with regard to the computer to which it is connected, and an interface that does support such plug and play. When the driver of such a peripheral is installed, two installer programs are available, namely a driver installer program for installation by the plug-and-play function, and a driver installer program for installation without using the plug-and-play function. This means that the user is required to perform the installation while referring to a manual or the like.

A driver is one type of computer program and the functionality thereof often is enhanced. In other words, there are instances where the driver provided by the manufacturer of a peripheral is superior, in terms of performance and user friendliness, to a driver with which the operating system comes equipped.

Thus, conventional methods of installation impose a complicated or hard-to-understand task upon the user and therefore are an impediment to easy operation.

SUMMARY OF THE INVENTION

Accordingly, an object of the present invention is to enable installation or updating of a driver by selecting the desired driver even in a case where a driver cannot be specified uniquely because there are a plurality of drivers corresponding to a single device ID, which is one example of identification information that specifies a peripheral device.

Another object of the present invention is to provide an installation method, install program and computer-readable storage medium storing the program that make it possible to install a printer driver through a single procedure even in a case where a connection is made to a plug-and-play interface or non-plug-and-play interface when the driver is installed in a computer.

According to the present invention, the foregoing objects are attained by providing an information processing apparatus for communicating with a peripheral device, comprising: acquisition means for acquiring one item of identification information that specifies a peripheral device, the identification information being output by the peripheral device in response to connection of the peripheral device or activation thereof; management means for managing a plurality of drivers, which correspond to the one item of identification information that specifies the peripheral device, together with information indicative of a set of drivers; input means for inputting information indicative of a set of drivers to be installed or updated; and recognition means for recognizing a driver to be installed or updated among the plurality of drivers managed by the management means, based upon the identification information acquired by the acquisition means and the information indicative of the set of drivers input by the input means.

Further, in accordance with a preferred embodiment of the present invention, a method of controlling installation of a driver has selection means for allowing a user to select a capability to be installed from among a plurality of capabilities of a peripheral device, characterized in that a discriminated model and a capability selected by the user are installed. Further, in an environment that does not employ a plug-and-play function, there is provided a selection function whereby a user can select the model and capability of a peripheral device by a user interface, characterized in that a selected model and function can be installed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram illustrating a window for selecting a method of installing a printer driver that uses a plug-and-play function and a method of installing a printer driver that does not use a plug-and-play function;

FIG. 4 is a diagram illustrating a window for selecting the capability of an installed printer in a method of installing a printer driver that uses a plug-and-play function;

FIG. 10 is a diagram illustrating a window for selecting a method of installing a driver that uses a plug-and-play function and a method of installing a driver that does not use a plug-and-play function according to a third embodiment of the invention;

FIG. 11 is a diagram illustrating a window for selecting the functions of an installed peripheral device in a method of installing a driver that uses a plug-and-play function according to the third embodiment;

FIG. 14 is a diagram illustrating a window for selecting the functions of an installed peripheral device in a method of installing a driver that uses a plug-and-play function according to the third embodiment.

DETAILED DESCRIPTION OF THE PREFERRED EMBODIMENTS

Preferred embodiments of the present invention will now be described in detail with reference to the accompanying drawings.

First Embodiment

<Example of Structure>

An embodiment ideal for application of the present invention will now be described.

Figure 1:
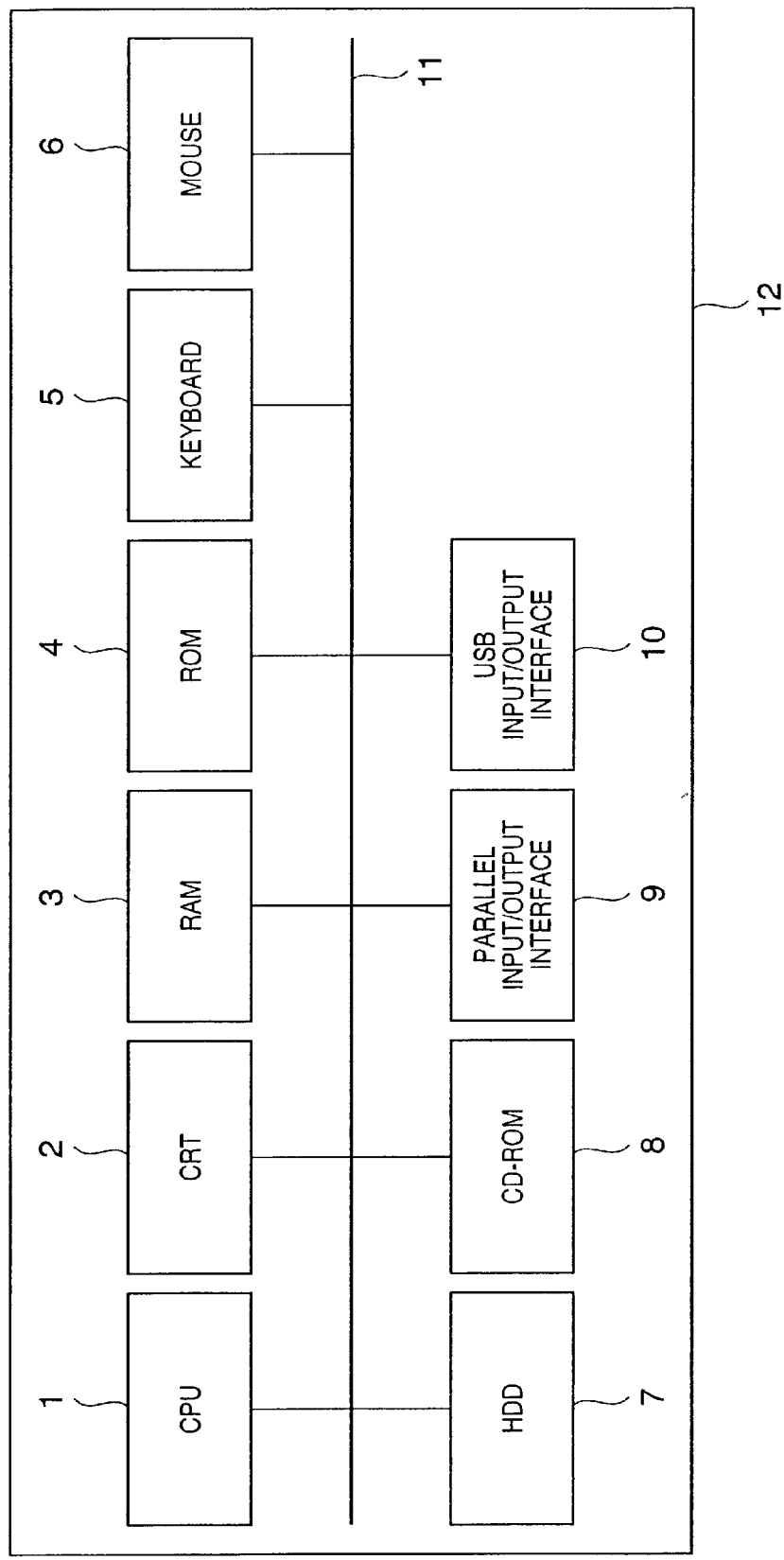
FIG. 1 is a block diagram of an information processing apparatus according to a first embodiment of the present invention.

FIG. 1 illustrates schematically the hardware implementation of a computer. A computer 12, which is an ideal example of an information processing apparatus, has a CPU 1 serving as the principal means for processing. The CPU 1 is capable of accessing a RAM and a ROM 4, which stores a BIOS or the like, via a system bus 11. A read-write-capable hard-disk drive 7 serving as an external storage device and CD-ROM drive 8 used as a read-only medium are connected to the system bus 11. A display unit (CRT) 2 for displaying instructions to the user as well as results of processing, a keyboard 5 that allows the user to enter commands, and a mouse 6 serving as a pointing device in cooperation with the display screen of the CRT 2 are connected to the system bus 11. A peripheral device such as a printer is capable of being connected via a parallel input/output interface 9 and a USB (Universal Serial Bus) input/output interface 10. According to this embodiment, a printer mainly is described as an ideal example of a peripheral device. However, examples of the peripheral device include a laser printer, an inkjet printer, a copier and a facsimile machine as well as a multifunction peripheral (referred to as an "MFP" below) that is a combination of these devices, a digital camera and a digital video camera.

The structure of the computer 12 has been described in simple terms. However, the interface for connecting the peripheral device such as the aforementioned printer need not be limited to the parallel input/output interface 9 (a parallel interface in accordance with the specifications of Centronics Corporation) and USB input/output interface 10, and it is possible to adopt various other connection configurations. The structure of the computer 12 would be similar in the case of connection by an IEEE 1394 interface or any interface that may be developed in the future.

In this embodiment, a set of drivers and their installers (programs) is stored on a single CD-ROM storage medium and it is assumed that installation is performed by inserting this CD-ROM in the CD-ROM drive 8. However, the storage medium is not limited to a CD-ROM. For example, the storage medium may be a floppy disk (or a plurality thereof), a portable storage medium such as a magneto-optical disk or DVD-ROM, a storage device possessed by a file server on a network, or a storage device possessed by an FTP server on the Internet.

In the implementation described above, a driver according to this embodiment meets the following two requirements:

<First Requirement>

As is well known, printer language (PDL) interpreted by a printer has undergone gradual enhancement in terms of functionality. The latest printers support the latest versions of printer language. However, in order to exploit existing resources effectively, it is desired that a printer be made to support an older version of printer language. An ordinary printer will support a printer language whose version is older than the version that the printer employs. There are many printers that will support not only different versions of the same printer language but also other versions of other languages by virtue of emulation.

Accordingly, in a case where a printer driver is installed, it is necessary to also take into consideration the printer language of the driver that will be installed.

This point is easy to understand when one considers a case where a plurality of printers are connected on a network, for example. Even though the printers may support the same language, the versions of the printer language may differ. But if a printer driver whose printer language is the version that is the greatest common denominator is installed in such case, the same driver can be used even if the user changes the destination at which the output is to be printed. This makes it possible to prevent the occurrence of trouble. In other words, it is possible to alleviate the burden imposed on the system administrator.

On the other hand, in order for a user having a certain degree of knowledge and expertise to exploit the full functionality of the printer to be used, it is desirable that the language and version used be freely selectable.

Accordingly, the installer according to this embodiment is made to reconcile these needs.

It should be noted that plug and play is a technique by which a computer, which is one ideal example of an information processing apparatus, receives a device ID, which is one ideal example of identification information provided for each printer model, from a printer, selects the driver that corresponds to the device ID received and installs the driver in the computer.

<Second Requirement>

In recent computers, there are several ports that can be used to connect a peripheral such as a printer directly to the computer. Examples of the ports are a USB port, a serial (RS232C, etc.) port and, depending upon the case, a port compliant with IEEE 1394. Among these ports, the parallel port was in wide use for printer connection prior to the appearance of plug and play. Accordingly, printers connected to a parallel port include those having a plug-and-play capability and those not having this capability. If the computer itself is of an old type, bi-directional communication itself may be impossible. Even if the printer supports plug and play, therefore, the plug-and-play function will not be effective in the case of such a computer (because plug and play employs an interface that is capable of bi-directional communication).

On the other hand, since a USB interface is a new-type interface that has appeared in recent years, devices that can be connected to a USB support plug and play.

Accordingly, in this embodiment, if a device supports plug and play, it is assumed that installation of the device is simple.

In order to simplify the description that follows, it will be assumed that a device that supports plug and play is a printer connected via the USB input/output interface 10, and that a device that does not support plug and play is connected via the parallel input/output interface 9.

<Installation Procedure>

First, in order to install the printer driver for a printer in the computer, the user inserts a CD-ROM storing (containing) the driver and installer in the CD-ROM drive 8.

Figure 5:
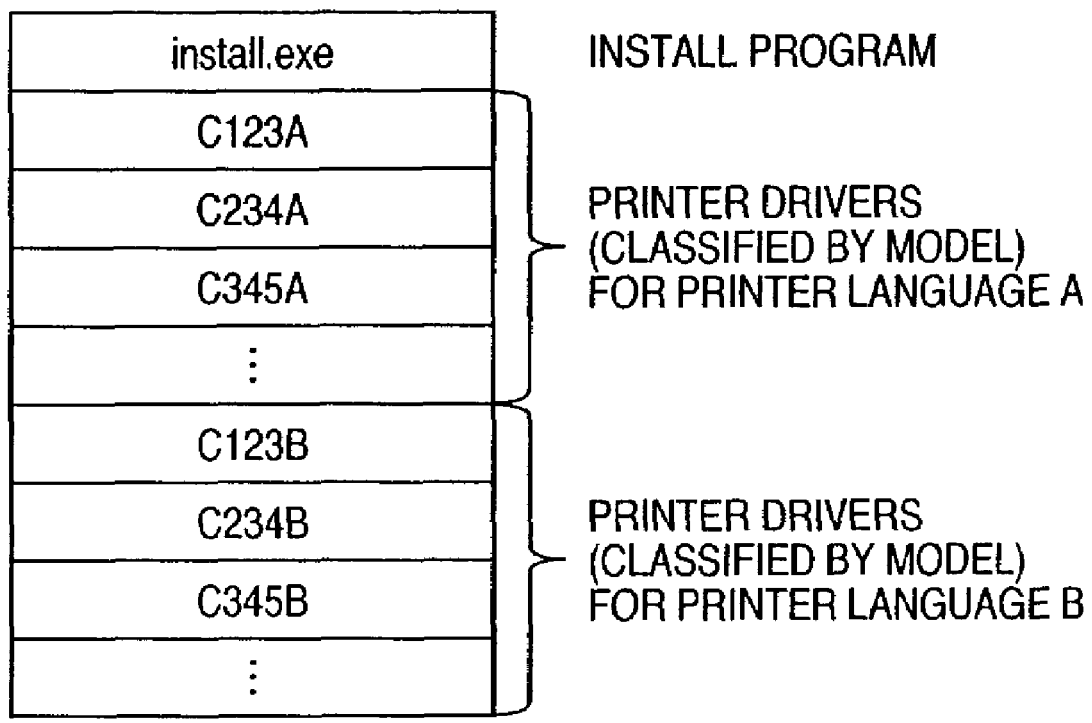
FIG. 5 is a diagram illustrating the content of a CD-ROM containing printer drivers according to the embodiment.

The files that have been stored on the CD-ROM are as shown in FIG. 5 by way of example.

In FIG. 5, "install.exe" represents an install program; Cxxx (where xxx represents a numeral), which represent the other files, indicate the model names of printers; and the "A" and "B" that follow the model name indicate printer language A and printer language B, respectively. More specifically, it is so arranged that even though the model name (model) is the same, it is possible to install the printer driver for either printer language A or printer language B used by that model. It should be noted that although the printer languages shown in FIG. 5 are the languages A and B, naturally the number of printer languages is not limited to two, and three or more may be available.

When the install program "install.exe" is run (executed by the CPU 1 of the computer), an initial window is displayed and a message (not shown) relating to the copyright is displayed in the window. Next, a cursor operatively associated with a mouse or the like is moved to a "NEXT" button, which is displayed at a prescribed position on the window, and the button is clicked, thereby causing the window shown in FIG. 3 to be displayed.

Figure 2:
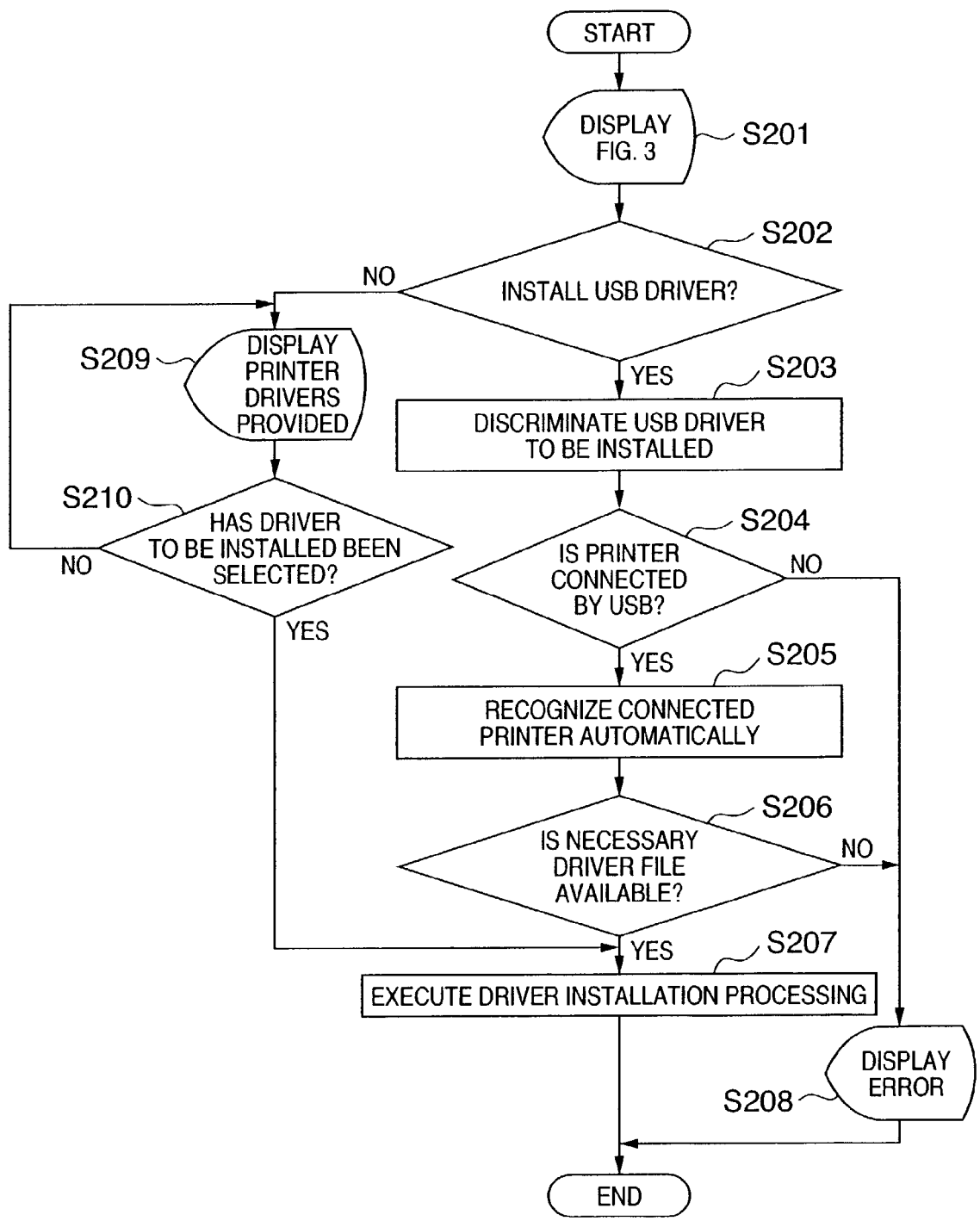
FIG. 2 is a flowchart of processing by a printer driver installer according to the embodiment.

FIG. 2 illustrates processing starting with the processing for presenting the display of FIG. 3 when the program "install.exe" is executed.

First, at step S201, the window of the GUI shown in FIG. 3 is displayed. In FIG. 3, whether or not the driver for a USB-connected printer is to be installed or not is indicated. In other words, a window is displayed for the purpose of selecting whether or not to install a printer driver for a printer that supports plug and play.

In order to install the printer driver for the USB-connected printer when the window shown in FIG. 3 is being displayed, the user checks a check box 30 (moves the mouse cursor to this box position and clicks on the box), whereupon it becomes possible to select whether or not to install the printer driver for a particular language, which is displayed below the check box, employed by this printer (i.e., it becomes possible to click on a radio button in a group 31 thereof). In a case where the check box 30 has not been checked, the display of the radio buttons and "PRINTER LANGUAGE A", "PRINTER LANGUAGE B" for selecting the printer language is dimmed so that the user can tell visually that selection is not possible.

If the check box 30 is checked, the user is allowed to select either of the two printer languages, namely printing that utilizes the capabilities of either of the printers. (Printer language A is made the default setting.) If "NEXT" is clicked in the display of FIG. 3 (non-USB-connected printer=non-plug-and-play printer) or in the display of FIG. 4 (USB-connected printer=plug-and-play printer), processing proceeds to step S202 in FIG. 2, where the installer discriminates which installation has been selected by the user.

If it is determined that installation of the driver for the USB connection (the driver for a plug-and-play-compatible printer connected via the plug-and-play interface) has been selected, the installer further discriminates at step S203 which driver capability the user has selected, i.e., whether printer language A or B in FIG. 4 has been selected. It is determined whether the printer power supply is ON or not and, if the power supply is OFF, a dialog box showing a message that prompts the user to turn the power supply on is displayed. Then, at step S204, it is determined whether a USB-connected printer is available or not. When a USB-connected printer cannot be detected within a fixed period of time, error dialog (an error message to the effect that the printer power supply is not ON or that the printer is not USB-connected) is displayed at step S208 and the installer of the printer driver is forced to quit.

When a printer connected by the USB can be detected, information concerning the model name of the printer is recognized automatically at step S205 and then it is discriminated at step S206 whether the printer is one whose printer driver has been stored on the CD-ROM. Taking the earlier described FIG. 5 as an example, the character strings exclusive of the final characters "A", "B" are the model names and therefore the determination can be made based upon the model names. It should be noted that it will suffice if the printer driver can discriminate the model name and printer language, and therefore it is obvious that the above example does not impose a particular limitation.

When the installer clarifies at step S206 that the printer is one for which the printer driver has not been stored, the error dialog is displayed at step S208 and the installer of the driver installer is forced to quit.

If the installer judges that the applicable printer driver exists, the installer installs the printer driver (the driver for which the character A or B follows the model name) of the printer having the printer capabilities selected by the user in FIG. 4 in the operating system at step S207.

On the other hand, when it is discriminated at step S202 that a driver for USB connection is not to be installed, i.e., that a non-plug-and-play printer driver is to be installed, all printer drivers and their capabilities stored by the installer are displayed at step S209.

When it is found at step S210 that a printer driver to be installed has not been selected by the user, control returns to step S209. When a printer driver has been selected, the printer driver selected by the user at step S209 is installed in the operating system at step S207.

In accordance with this embodiment, as described above, installation of a printer driver can be implemented by a single printer-driver installer (install program), both a method of installing a printer driver that uses a plug-and-play function and a method of installation that does not use a plug-and-play function are made available, and it is possible to select a driver of a printer having particular capabilities. In other words, regardless of whichever installation method the user employs to install a printer driver, installation can be carried out if only the installer is launched. As a result, the user need not prepare beforehand storage media storing printer drivers and need no longer perform operations that are complicated or difficult to understand, and it is possible to complete the installation of printer drivers in simple fashion.

In this embodiment, a printer driver that employs a plug-and-play function is described taking a USB-connected printer as an example. However, as long as the interface connected supports plug and play, any interface will suffice.

For example, if an IEEE interface or some other interface also is included as an plug-and-play interface, the text "INSTALL USB-CONNECTED PRINTER" at the check box in FIG. 3 would be changed to read "INSTALL PRINTER COMPLIANT WITH PLUG-AND-PLAY INTERFACE".

It should be noted that when devices are connected to a plurality of interfaces, the devices are searched. This takes some time. Accordingly, if the types of interfaces are known in advance, the types of interfaces that are connectable may be displayed by providing radio buttons and check boxes and a search may be conducted among these.

Second Embodiment

Figure 6:
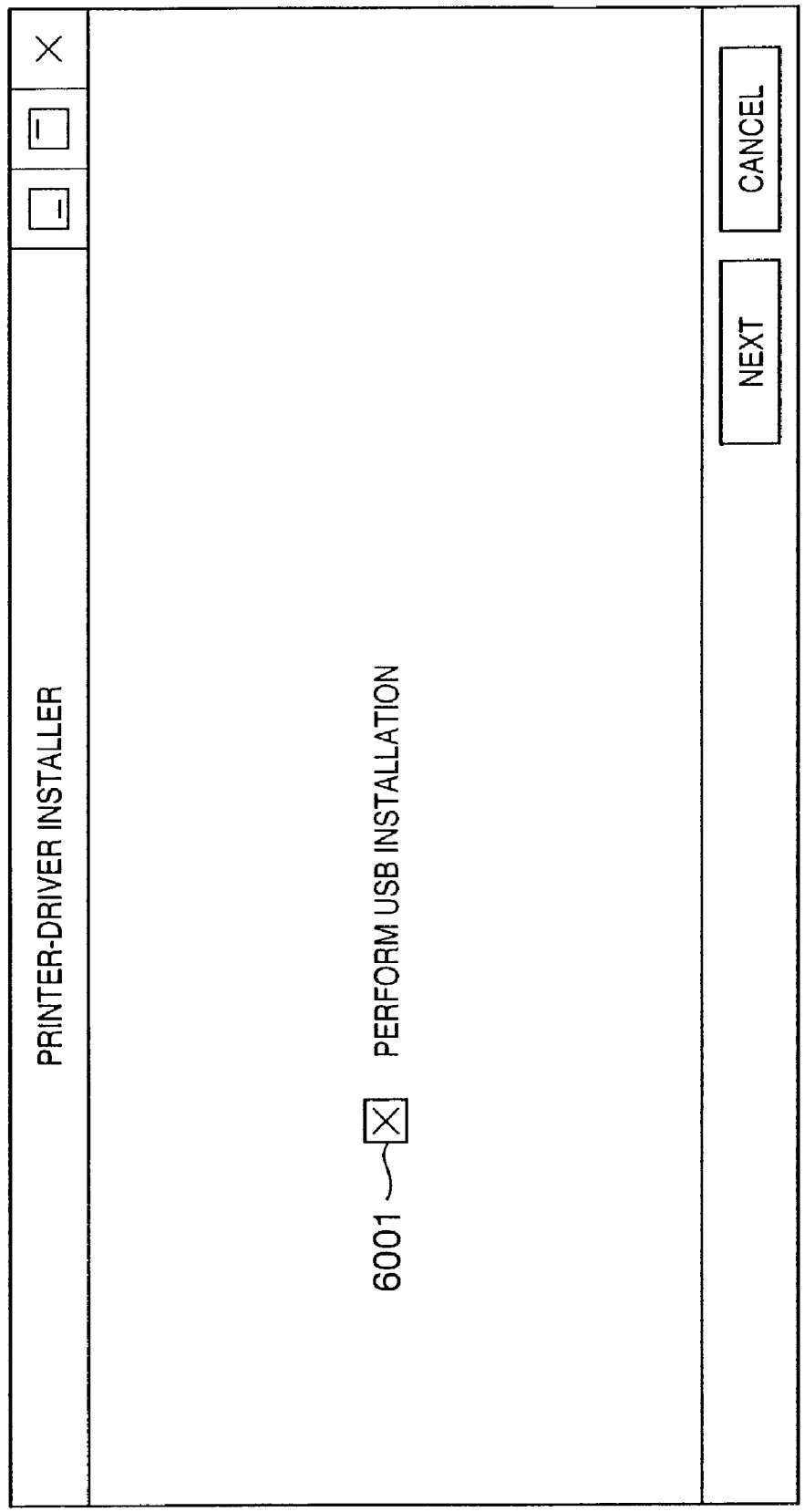
FIG. 6 is a setup screen that makes it possible to select USB plug-and-play installation processing according to a second embodiment of the present invention.
Figure 7:
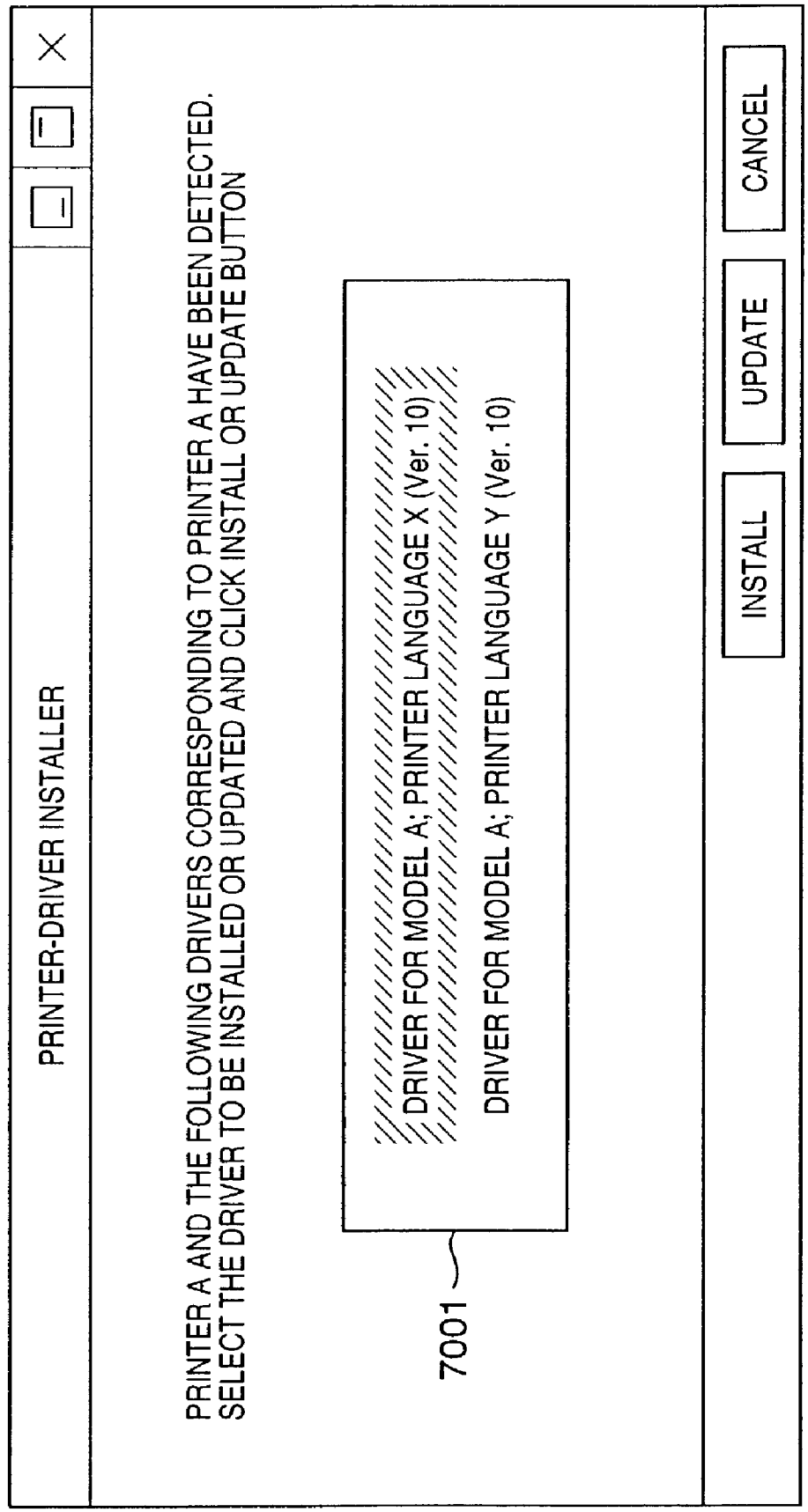
FIG. 7 is a setup screen that makes it possible to select a detected driver.
Figure 8:
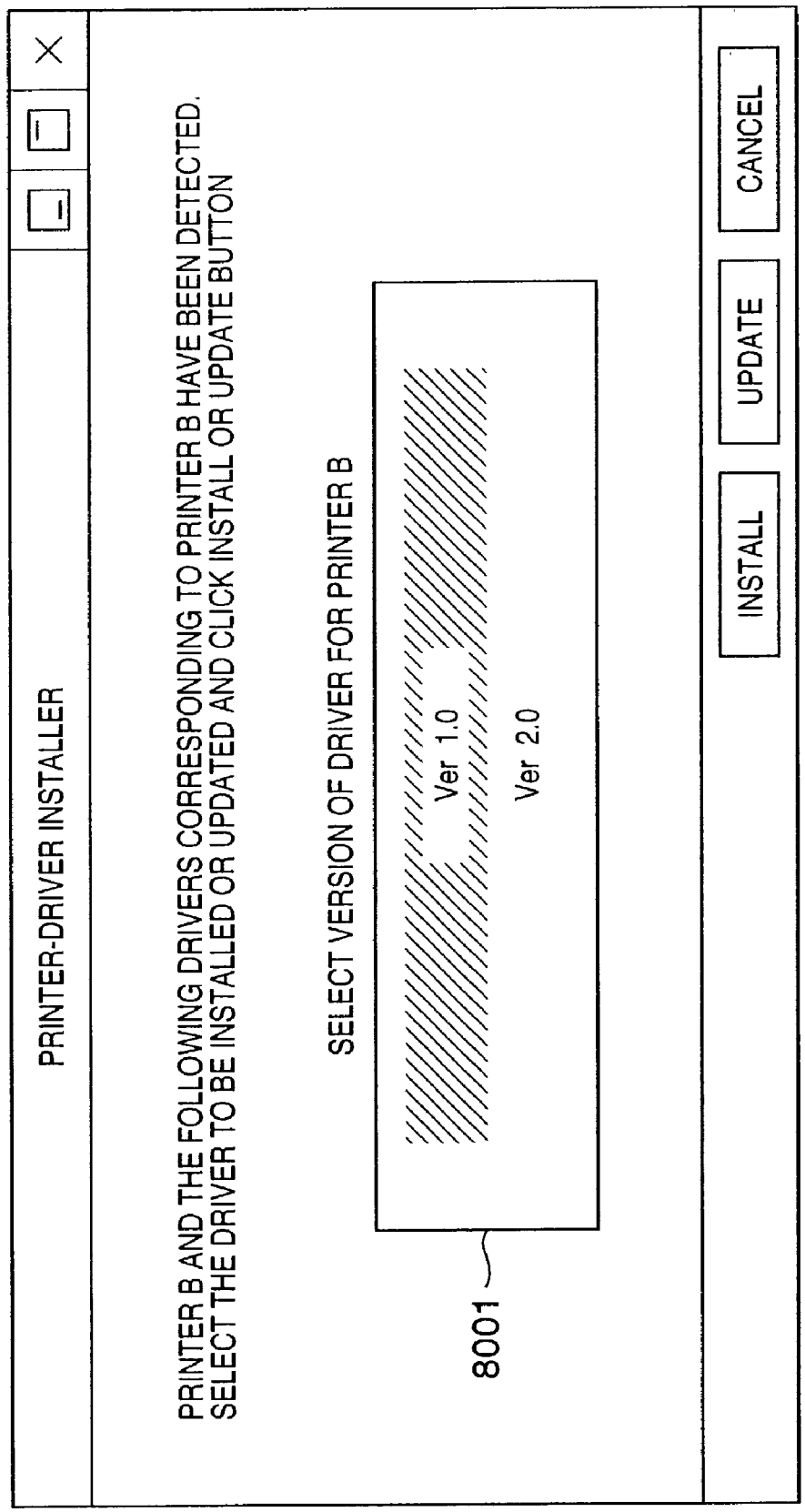
FIG. 8 is a setup screen that makes it possible to select a detected driver.
Figure 9:
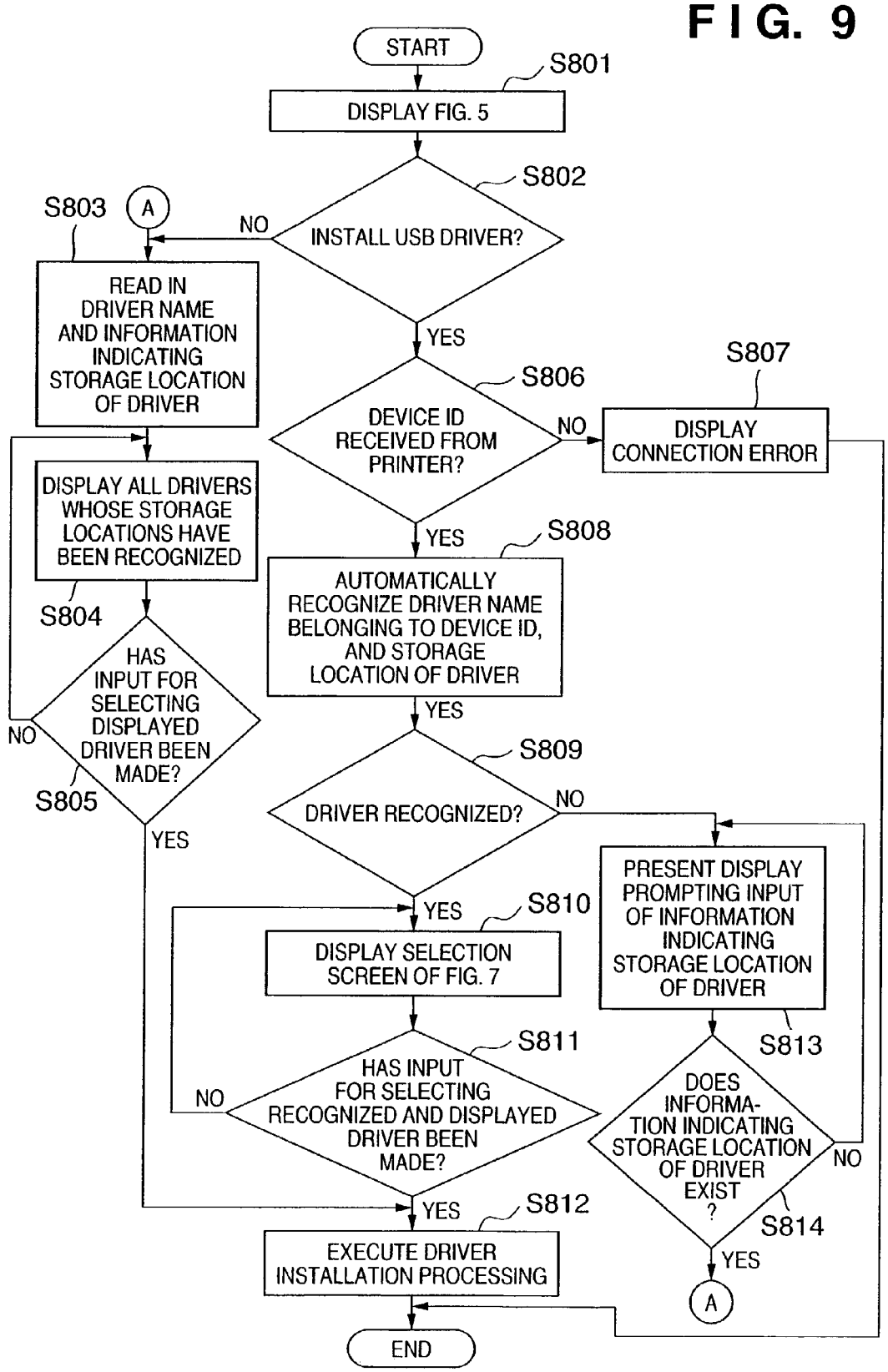
FIG. 9 is a flowchart illustrating a modification of plug-and-play driver-installation processing that relies upon a USB.

FIG. 6 is a setup screen that makes it possible to select USB plug-and-play installation processing, FIGS. 7 and 9 are setup screens that make it possible to select a detected driver, and FIG. 9 illustrates a modification of plug-and-play driver-installation processing that relies upon a USB. A second embodiment of the present invention will be described with reference to FIGS. 6 to 9. Aspects that differ from those of the first embodiment will be described below. In the first embodiment, the user is instructed to select the language supported by a printer driver before a printer, which is an ideal example of a print processing apparatus, receives a device ID, which is an ideal example of information that specifies a printer, from a computer that is an ideal example of an information processing apparatus. The second embodiment described below considers processing in which the device ID is received, an installable printer driver is detected based upon the ID, and the user is allowed to select the detected driver.

It should be noted that installers include a driver installer packaged in an operating system as an application, and a system installer packaged as one function of an operating system.

First, when a set-up command is entered using the mouse 4 or keyboard 5 of FIG. 1, the driver installer of the printer driver displays the setup screen of FIG. 6 at step S801 in FIG. 9. If the operator clicks on the "NEXT" button in FIG. 6 without placing a check in the check box in FIG. 6, the driver installer advances control to ordinary driver-installation processing from step S803 onward. At step S803, the system installer reads in a driver name, which is referred to as an INF file, and information indicating the storage location of the driver. The information indicating the storage location of the driver may be a directory name indicating a prescribed memory of the storage medium on which the driver has been stored, an URL indicating a prescribed storage area of an external server (not shown) connected to the computer via a network, or a directory name referred to as a UNC bus. This is followed by step S804, at which the driver installer controls display processing so as to display a list of all drivers whose driver storage locations storing drivers corresponding to device IDs have been recognized. Next, at step S805, the driver installer waits for an input designating selection of a driver displayed at step S804. If there is no input, the driver installer controls display processing so as to maintain the status of the display of step S804. If an input designating selection of a driver is made at step S805, then the driver installer controls the system installer so as to execute processing to install the selected driver.

On the other hand, if installation of a USB driver indicating that plug-and-play installation is to be performed is specified at step S802 and the "NEXT" button is pressed, the processing of step S806 is executed. Here the driver installer discriminates whether a device ID has been received from a printer device. If the driver installer determines that a device ID has not been received even upon elapse of a predetermined length of time, the driver installer terminates processing at step S807 upon displaying an error message such as one reading "PRINTER POWER SUPPLY IS NOT ON OR PLUG-AND-PLAY DEVICE HAS NOT BEEN CONNECTED". More specifically, a device ID is received as a result of the operating system controlling the USB interface. In response to connection of the printer via the prescribed communication medium (USB) or activation of the printer, the driver installer (acquisition means) acquires from the operating system the device ID, which is output by the printer, identifying the printer. If the driver installer cannot acquire a device ID from the operating system within a fixed period of time, the driver installer displays the error message of step S807.

If the computer determines a device ID has been received from the printer at step S806, the driver installer (acquisition means) acquires the device ID from the operating system and reads in the driver information file (referred to as an "INF file" below) from a file that has been stored at a storage area set in the driver installer beforehand. In general, drivers can be classified into sets based upon the version of the driver, the type of printer language supported, the version of the printer language supported and the driver name. Accordingly, a driver usually will belong to any one of these sets. To which set an available driver belongs, the device ID corresponding to the printer that uses this driver and the storage location of the driver are described in the INF file in the following manner:

INF file: "driver name, driver set, device ID, driver storage location"

For example, an INF file is described as follows:

"Model A, Printer Language X ver. 1, ¥¥server01¥driver¥setup¥xdriver.dll
Model A, Printer Language Y ver. 1, ¥¥server01¥driver¥setup¥xdriver.dll
Model B, Printer Language X ver. 1, ¥¥server01¥driver¥setup¥xdriver.dll
Model B, Printer Language X ver. 2, ¥¥server01¥driver¥setup¥xdriver.dll"

In this example, "Model A" is the device ID and serves as the driver name at the same time. It is described that the "Model A" driver on the first line belongs to a set of drivers whose printer language is X and whose version is 1.0, and that this driver has been stored in a shared directory, namely ¥driver¥setup¥xdriver.dll of server 01. As will be described later, this INF file is read in and managed by the driver installer (management means). The markup on the other lines is interpreted in similar fashion.

The driver installer reads in the INF file, extracts and stores a list of driver information that includes information indicating the driver set containing the driver corresponding to the device ID recognized based upon the device ID that the driver installer acquired form the operating system, and information indicating the storage location of the driver, and manages the information. In a case where the driver installer (management means) has recognized a plurality of drivers corresponding to one device ID, the driver installer reads in and retains the information of each driver from the above-mentioned INF file, thereby indirectly managing the substance of the printer driver.

More specifically, the driver installer (management means) manages a plurality of items of driver information corresponding to a device ID that specifies a printer. If the driver installer has recognized driver information corresponding to one acquired device ID at step S808, then the installer displays the driver selection screen shown in FIG. 7. In FIG. 7, information indicating driver sets inclusive of driver version, type of printer language supported, version of printer language supported and driver name is displayed in order to allow selection by the user.

FIG. 7 will now be described. Here an example in which the driver installer has detected Printer A will be described. The operating system determines that the printer has been connected to the computer of the operating system by receiving the device ID (Model A) corresponding to Printer A. The operating system inputs the device ID of Printer A to the driver installer. The latter reads out information corresponding to the device ID (Model A), which corresponds to Printer A of the above-described INF file. As a result, information indicating the sets of drivers to which drivers available for the computer belong, namely information such as the driver names, which includes the versions of a plurality of drivers, types of printer languages supported by the drivers and versions of the drivers, as well as the driver storage locations, are input to the driver installer. The input information is managed within the driver installer in the manner described above.

FIG. 7 illustrates the manner in which a plurality of drivers are displayed in a driver-information input section 7001. The driver (printer language X, Ver. 1.0) for Model A and the driver (printer language Y, Ver. 1.0) for Model A are displayed in the driver-information input section 7001. In this embodiment, the driver name is the driver for Model A. There are cases where a plurality of drivers supporting different printer languages exist with respect to a single device ID, or cases where drivers have the same driver function but the versions differ owing to version upgrade or the like. Though there are cases where drivers have different language versions but support languages of the same type, here it will be considered that such languages are different languages.

Under such circumstances, a plurality of drivers are displayed with regard to a single received ID and a displayed driver can be selected by inputting information indicating the driver set to which the driver to be installed belongs. The input can be made by having the user operate the mouse 4.

If the set of the desired driver is selected in the driver-information input section 7001 (input means) of FIG. 7 and the "INSTALL" or "UPDATE" button of FIG. 7 is clicked on at step S811, the driver name, the printer language supported by the driver and the version of the printer language are input to the driver installer as information indicating the set of the driver to be installed or updated. When the set of the driver is selected and the install or update button is clicked on to command installation or updating, the set of the driver selected earlier is input to the driver installer. At step S812, the driver installer instructs the system installer to execute driver installation or processing for updating an existing driver, thereby controlling installation or update processing. Processing is then exited.

More specifically, the driver installer selects a plurality of drivers, which correspond to a device ID that specifies a printer acquired from the operating system, at step S808. Using the information indicating the driver set input to the driver installer, the driver installer specifies a single driver, from among the list of drivers of step S808, at step S811. Similarly, the driver installer reads out or downloads the driver from the driver storage location described in the INF file and, at step S812, installs or updates the driver specified.

In FIG. 7, all driver names, versions of printer languages and corresponding printer languages are displayed as information indicative of a driver set. As long as drivers can be specified uniquely, however, information indicating a set of drivers can be displayed in a variety of ways. For example, as shown in FIG. 8, in case of Printer B for which one language is supported, the driver installer extracts the driver version information from the managed driver information and causes the operating system to display the version information on in a driver-information input section 8001 so that the version can be selected.

Displaying the necessary information selectively makes it possible for the user to input information necessary for specifying a driver without being perplexed by complicated information indicating a set of drivers. In a case where drivers for which only the versions of a printer language corresponding to a recognized device ID differ have been detected, only the versions of the detected language may be displayed to allow selection. In case of a model for which there is only one language supported, only the versions of drivers may be displayed to allow selection. The driver installer acquires the device ID that specifies a printer and picks drivers that correspond to this device ID. Using information, which has been input to the driver installer, indicating the set to which a driver desired to be installed belongs, the driver installer recognizes the driver, which is to be installed or updated, from the drivers that have been picked.

When a driver is updated, processing for performing overwrite installation is executed if the driver is that of an old version or installation may be performed after the driver of the old version is deleted by being uninstalled. If the install or update button is clicked on at step S811, the driver installer controls the operating system so as to maintain the status of the display screen shown in FIG. 7.

If the result of the processing at step S809 is that a prescribed file does not exist or that the file does exist but a driver cannot be recognized from the file information, or if a driver corresponding to the received device ID is not recognized, then, in order that a new file of information indicating the driver name and driver storage location may be read in, a message prompting the user to specify the location of this file is output. A display prompting the user to enter information indicating the driver storage location is presented at step S813. If an information file indicating the driver storage location is entered at step S814, processing from step S803 onward is executed.

Third Embodiment

Many MFPs have been proposed in recent years. An MFP is a single peripheral device having not just a single function, such as a printing function, but multiple functions such as printing, facsimile and scanning functions. There have also been many recent proposals concerning single-function peripheral devices, namely a peripheral device initially having only one function such as a printing function, that can be converted to an MFP by retroactively adding on an optional function such as a facsimile function (such a peripheral device when it has only one function will also be referred to as an MFP for the sake of simplicity). An embodiment corresponding to such an MFP will be described with reference to the accompanying drawings.

<Installation Procedure>

First, in order to install the MFP driver in the computer, the user inserts a CD-ROM storing (containing) the driver and installer in the CD-ROM drive 8.

Figure 12:
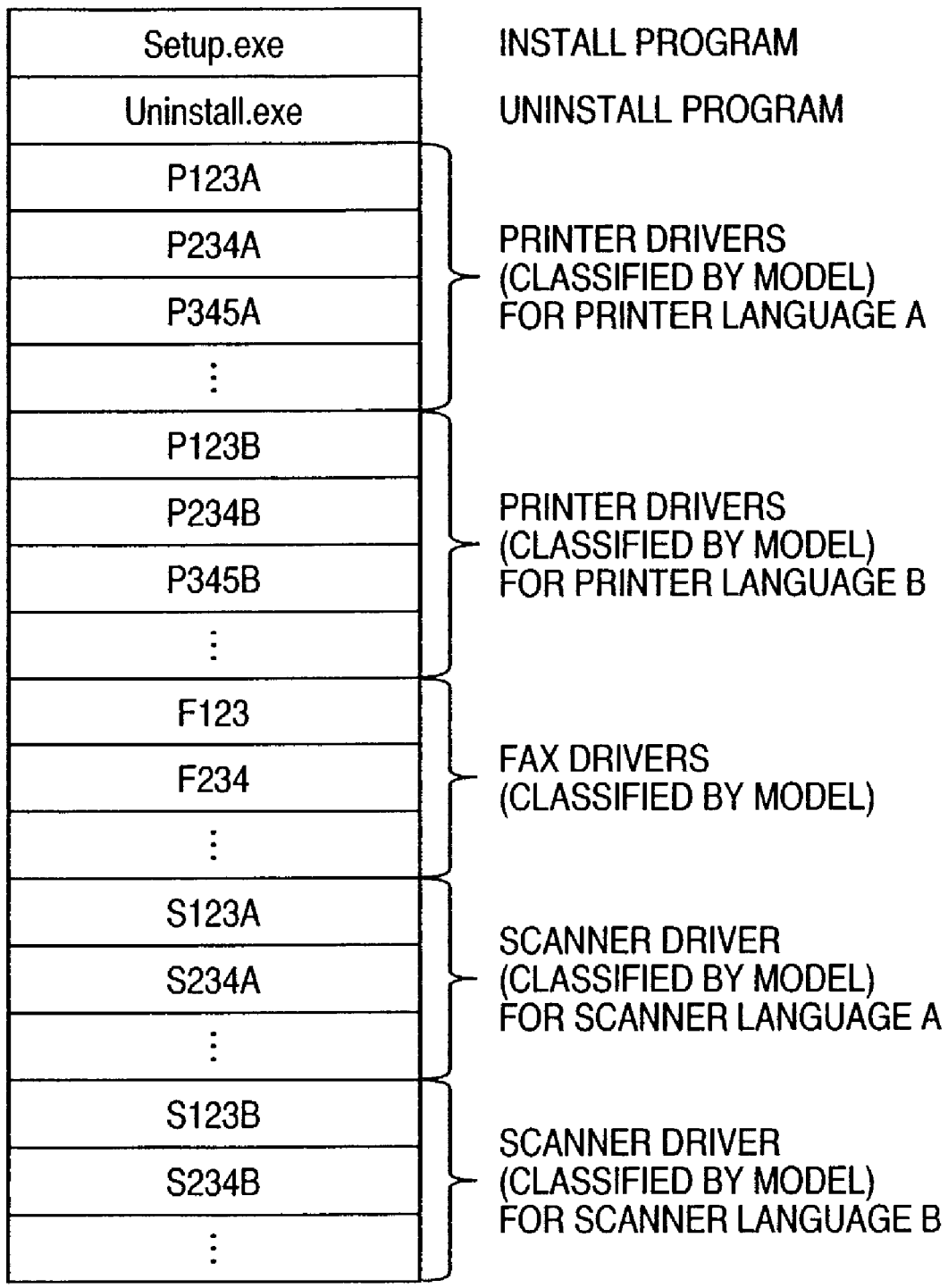
FIG. 12 is a diagram illustrating the content of a CD-ROM containing printer driver according to the third embodiment.

The files that have been stored on the CD-ROM are as shown in FIG. 12 by way of example.

In FIG. 12, "setup.exe" represents an install program. The leading characters, i.e., P, F, S, indicate whether the driver type is printer driver, fax driver or scanner driver. The next three numerals indicate the MFP model name. The last character, i.e., A or B, is used for both printer drivers and scanner drivers. When a driver is a printer driver, the characters A and B are indicative of drivers for printer languages A and B, respectively, indicating either a version of PDL, such as PCL5e or PCL6, or a printer language such as PCL or PS, or both. When a driver is a scanner driver, the characters A and B are indicative of drivers for scanner languages A and B, respectively, such as TWIN or ISIS. In FIG. 12, there are two printer driver languages A and B and two scanner languages A and B. Naturally, however, the number of languages is not limited to two and three or more languages may be available.

When the install program "setup.exe" is run (executed by the CPU 1 of the computer), an initial window is displayed and a message (not shown) relating to the copyright is displayed in the window. Next, a cursor operatively associated with a mouse or the like is moved to a "NEXT" button, which is displayed at a prescribed position on the window, and the button is clicked, thereby causing the window shown in FIG. 10 to be displayed.

Figure 13:
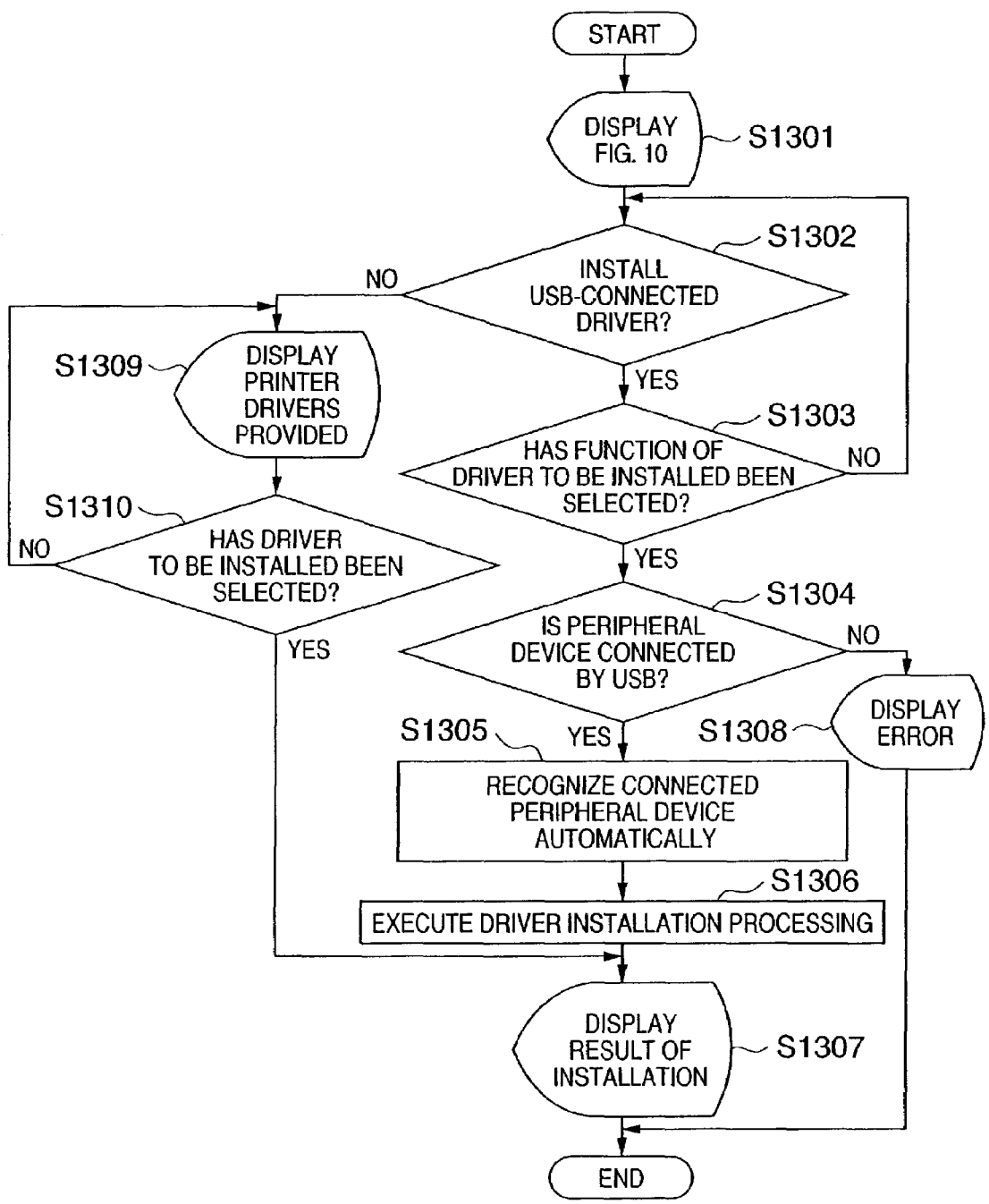
FIG. 13 is a flowchart of processing by a printer driver installer according to the third embodiment.

FIG. 13 illustrates processing starting with the processing for presenting the display of FIG. 10 when the program "setup.exe" is executed.

First, at step S1301, the window of the GUI shown in FIG. 10 is displayed. In FIG. 10, whether or not the driver for a USB-connected peripheral device is to be installed or not is indicated. In other words, a window is displayed for the purpose of selecting whether or not to install a peripheral-device driver that supports plug and play.

In order to install the driver for the USB-connected peripheral device when the window shown in FIG. 10 is being displayed, the user checks a check box 1001 (moves the mouse cursor to this box position and clicks on the box), whereupon it becomes possible to select whether or not to install the printer drivers of particular functions, which are displayed below the check box 1001, possessed by this peripheral device (i.e., it becomes possible to click on check boxes in a group 1002 thereof). In a case where the check box 1001 has not been checked, the display of the check boxes 1002, which are for selecting the functions of the peripheral device, and of "PRINTER LANGUAGE A", "PRINTER LANGUAGE B", "SCANNER LANGUAGE A", "SCANNER LANGUAGE B" is dimmed so that the user can tell visually that selection is not possible.

If the check box 1001 is checked, the user is allowed to select any of the three functions of the peripheral device, namely printing, facsimile and scanning functions.

In order to install the printer driver for the USB-connected peripheral device when the window shown in FIG. 11 is being displayed, the user checks the printing function in the check-box group 1101 (moves the mouse cursor to this box position and clicks on the box), whereupon it becomes possible to select whether or not to install the printer driver for a particular printer language, which is displayed on the right side of the check box, that is used by this printing function (i.e., it becomes possible to click on a radio button in a group thereof). In a case where the printing function has not been selected in the check-box group 1101, the display of the radio buttons, which are for selecting the printer language, and of "PRINTER LANGUAGE A", "PRINTER LANGUAGE B" is dimmed so that the user can tell visually that selection is not possible. With regard to printer drivers, printing can be performed if the user installs either one of the drivers for printer languages A and B, irrespective of the application used. Accordingly, the user may be allowed to select only one of the languages or may be allowed to select two, a plurality of or all languages.

If the printing function in the check-box group 1101 is checked, the user is allowed to select either of two printer languages, namely execution of printing utilizing either capability of the printer.

In order to install the fax driver for the USB-connected peripheral device when the window shown in FIG. 11 is being displayed, the user checks the facsimile function in the check-box group 1101 (moves the mouse cursor to this box position and clicks on the box), whereupon the user can specify installation of the fax driver.

In order to install the scanner driver for the USB-connected peripheral device when the window shown in FIG. 11 is being displayed, the user checks the scanning function in the check-box group 1101 (moves the mouse cursor to this box position and clicks on the box), whereupon it becomes possible to select whether or not to install the scanner driver for a particular printer language, which is displayed on the right side of the check box, that is used by this scanning function (i.e., it becomes possible to click on a radio button in a group thereof). In a case where the scanning function has not been selected in the check-box group 1101, the display of the radio buttons, which are for selecting the scanner language, and of "SCANNER LANGUAGE A", "SCANNER LANGUAGE B" is dimmed so that the user can tell visually that selection is not possible. With regard to scanner drivers, the scanner language capable of being used is limited depending upon the application employed by the user. Accordingly, the user may be allowed to select two, a plurality of or all languages.

If the scanning function in the check-box group 1101 is checked, the user is allowed to select either of two scanner languages, namely execution of scanning utilizing either capability of the scanner. (Scanner language A is made the default setting.)

If "NEXT" is clicked on in the display of FIG. 10 (non-USB-connected peripheral device=non-plug-and-play peripheral device), or in the display of FIG. 11 (USB-connected peripheral device=plug-and-play peripheral device), or in the display of FIG. 14 (USB-connected peripheral device=plug-and-play peripheral device), processing proceeds to step S1302 in FIG. 13, where the installer discriminates which installation has been selected by the user.

If it is determined that installation of the driver for the USB connection (the driver for a plug-and-play-compatible peripheral device connected via the plug-and-play interface) has been selected, the installer further discriminates at step S1303 which driver function the user has selected, i.e., which of the printing, facsimile and scanning functions in the check-box group 1101 of FIG. 11 has been selected. If not a single function has been selected for installation, the installer displays an error message in order to prompt the user to make a selection. The previous screen is then displayed.

Next, it is determined whether the power supply of the USB-connected peripheral device is ON or not and, if the power supply is OFF, a dialog box showing a message that prompts the user to turn the power supply on is displayed. Then, at step S1304, it is determined whether the a USB-connected peripheral device is available or not. When a USB-connected peripheral device cannot be detected within a fixed period of time, error dialog (an error message to the effect that the power supply of the peripheral device is not ON or that the peripheral device is not USB-connected) is displayed at step S1308 and the installer of the driver is forced to quit.

When a peripheral device connected by the USB can be detected, information concerning the model name of the printer is recognized automatically at step S1305 and then it is discriminated at step S1306 whether the peripheral device is one whose printer driver has been stored on the CD-ROM. Taking the earlier described FIG. 5 as an example, the character strings exclusive of the final characters "A", "B" are the model names and therefore the determination can be made based upon the model names. It should be noted that it will suffice if the driver can discriminate the model name and language (i.e,. the printer language, scanner language, etc.), and therefore it is obvious that the above example does not impose a particular limitation.

If the installer judges that the printer driver (a driver whose leading character in the model name is P and whose last character is A or B), fax driver (a driver whose leading character in the model name is F) and scanner driver (a driver whose leading character in the model name is S and whose last character is A or B) having the capabilities of the functions of the peripheral device selected by the user in FIG. 14 all exist, then the installer installs the drivers in the operating system at step S1306. Then, at step S1307, dialog to the effect that installation succeeded is displayed. The driver installer is then caused to quit.

When a driver for the function of the peripheral device has already been installed, an "Uninstall.exe" program stored on the CD-ROM of FIG. 12 is launched and the driver is deleted, after which the driver specified by the user is installed.

Further, when the installer clarifies at step S1306 that the peripheral device is one for which the drivers having the capabilities of the functions of the peripheral device selected by the user in FIG. 14 have not all been stored, only the drivers that have been stored are installed. Then, at step S1307, the drivers that could be installed are displayed, the drivers that could not be installed are displayed in a dialog box and the installer of the driver installer is forced to quit.

If a driver for the function of the peripheral device is still found to have already been installed, the "Uninstall.exe" program stored on the CD-ROM of FIG. 12 is launched and the driver is deleted, after which the driver specified by the user is installed.

Other Embodiments

It should be evident from the above-described embodiments that the present invention is applicable to an install program stored on a storage medium and to a computer-readable storage medium storing the program.

Thus, in accordance with the present invention as described above, when a printer driver is installed in a computer, installation can be carried out by a single procedure even in a case where connection is made to a plug-and-play interface or a non-plug-and-play interface.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus for communicating with an image forming device, comprising:
    acquisition means that acquires, from the image forming device, identification information specifying the image forming device;
    management means that manages a plurality of groups of drivers, each group corresponding to one identification information specifying one image forming device, together with information indicative of the group of drivers;
    specifying means that specifies a group of drivers corresponding to the identification information acquired by said acquisition means from among the plurality of groups of drivers managed by said management means;
    input means that inputs information indicative of a type of driver to be installed or updated; and
    recognition means that recognizes a driver to be installed or updated from among the group of drivers specified by said specifying means, based upon the identification information acquired by said acquisition means and the information input by said input means,
    wherein the group of drivers includes printer drivers and facsimile drivers,
    and said apparatus further comprises:
    display control means that controls display of a user interface for selecting whether or not installation of a driver for the image forming device is made using Plug and Play function; and
    installation control means which, if installation of a driver using the Plug and Play is selected, controls a process to install a driver selected based on a recognition result of the recognition means, and if installation not using the Plug and Play function is selected, performing control so as to display a list for selecting one of predetermined drivers on a user interface and controlling an operating system so as to install a selected driver.

2. The apparatus according to claim 1, wherein the image forming device is a single-function or multifunction apparatus having one or more image processing functions from among printer, scanner and facsimile functions, and the information indicative of the type of driver is information indicating a printer control language capable of being processed by drivers belonging to the group of drivers, and/or types of other image processing functions capable of being processed by the drivers.

3. The apparatus according to claim 1, wherein the information indicative of the type of driver includes version information of drivers of the group to which the drivers belong.

4. The apparatus according to claim 1, wherein the information indicative of the type of driver is input by said input means before said acquisition means acquires the identification information.

5. The apparatus according to claim 1, wherein in a case where a plurality of drivers corresponding to the identification information are supported, said recognition means allows input of information indicative of a plurality of types by said input means based upon the identification information, which has been acquired by said acquisition means.

6. The apparatus according to claim 1, wherein the group of drivers includes scanner drivers.

7. An information processing method for communicating with an image forming device, comprising:
    an acquisition step of acquiring, from the image forming device, identification information specifying the image forming device;
    a management step of managing a plurality of groups of drivers, each group corresponding to one identification information specifying one image forming device, together with information indicative of the group of drivers;
    a specifying step for specifying a group of drivers corresponding to the identification information acquired by said acquisition means from among the plurality of groups managed by said management step;
    an input step of inputting information indicative of a type of driver to be installed or updated; and a recognition step of recognizing a driver to be installed or updated from among the group of drivers specified by said specifying step, based upon the identification information acquired at said acquisition step and the information input at said input step, wherein the group of drivers includes printer drivers and facsimile drivers, and wherein said method further comprises:

a display control step for controlling display of a user interface for selecting whether or not installation of a driver for the image forming device is made using Plug and Play function; and an installation control step which, if installation of a driver using the Plug and Play function is selected, controls a process to install a driver selected based on a recognition result of the recognition step, and if installation not using the Plug and Play function is selected, performing control so as to display a list for selecting one of predetermined drivers on a user interface and controlling an operating system so as to install a selected driver.

8. The method according to claim 7, wherein said image forming device is a printing device that is a single-function or multifunction apparatus having one or more image processing functions from among printer, scanner and facsimile functions, and the information indicative of the type of driver is information indicating printer control language capable of being processed by drivers belonging to the group of drivers, and/or types of other image processing functions capable of being processed by the drivers.

9. The method according to claim 7, wherein the information indicative of the type of driver includes version information of drivers of the group to which the drivers belong.

10. The method according to claim 7, wherein the information indicative of the type of driver is input at said input step before the identification information is acquired at said acquisition step.

11. The method according to claim 7, wherein in a case where a plurality of drivers corresponding to the identification information are supported, said recognition step allows input of information indicative of a plurality of types at said input step based upon the identification information, which has been acquired at said acquisition step.

12. The method according to claim 7, wherein the group of drivers includes scanner drivers.

13. A computer-readable storage medium on which is stored a computer program for an information apparatus for communicating with an image forming device, said computer program executing processing of the following steps:

an acquisition step of acquiring, from the image forming device, identification information specifying the image forming device;

a management step of managing a plurality of groups of drivers, each group corresponding to one identification information specifying one image forming device, together with information indicative of the group of drivers;

a specifying step for specifying a group of drivers corresponding to the identification information acquired by said acquisition step from among the groups of drivers managed by said management step;

an input step of inputting information indicative of a type of driver to be installed or updated; and a recognition step of recognizing a driver to be installed or updated from among the group of drivers specified by said specifying step, based upon the identification information acquired at said acquisition step and the information input at said input step, wherein the group of drivers includes printer drivers and facsimile drivers, and wherein said program further comprises:

a display control step for controlling display of a user interface for selecting whether or not installation of a driver for the image forming device is made using Plug and Play function; and an installation control step which, if installation of a driver using the Plug and Play function is selected, controls a process to install a driver selected based on a recognition result of the recognition step, and if installation not using the Plug and Play function is selected, performing control so as to display a list for selecting one of predetermined drivers on a user interface and controlling an operating system so as to install a selected driver.

* * * * *